(12) United States Patent
Salinger

(10) Patent No.: US 9,313,554 B2
(45) Date of Patent: *Apr. 12, 2016

(54) DYNAMIC BANDWIDTH LOAD BALANCING IN A DATA DISTRIBUTION NETWORK

(71) Applicant: Comcast Cable Communications, LLC, Philadelphia, PA (US)

(72) Inventor: Jorge Salinger, Littleton, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 323 days.

This patent is subject to a terminal disclaimer.

(21) Appl. No.: 13/762,690

(22) Filed: Feb. 8, 2013

(65) Prior Publication Data

US 2013/0160067 A1      Jun. 20, 2013

Related U.S. Application Data

(63) Continuation of application No. 12/862,709, filed on Aug. 24, 2010, now Pat. No. 8,392,533.

(51) Int. Cl.
| | |
|---|---|
| *G06F 15/16* | (2006.01) |
| *H04N 21/654* | (2011.01) |
| *H04L 29/06* | (2006.01) |
| *H04N 7/173* | (2011.01) |
| *H04N 21/236* | (2011.01) |
| *H04N 21/266* | (2011.01) |
| *H04L 12/803* | (2013.01) |

(52) U.S. Cl.
CPC .......... *H04N 21/654* (2013.01); *H04L 65/1089* (2013.01); *H04L 29/06* (2013.01); *H04L 47/125* (2013.01); *H04L 65/4076* (2013.01); *H04L 65/4084* (2013.01); *H04L 65/4092* (2013.01); *H04N 7/17318* (2013.01); *H04N 21/236* (2013.01); *H04N 21/266* (2013.01)

(58) Field of Classification Search
USPC ......................................................... 709/231
See application file for complete search history.

(56) References Cited

U.S. PATENT DOCUMENTS

| | | | | |
|---|---|---|---|---|
| 5,953,506 | A  * | 9/1999 | Kalra et al. ................... | 709/231 |
| 6,266,345 | B1 * | 7/2001 | Huang .......................... | 370/468 |
| 7,113,998 | B1 * | 9/2006 | Stern et al. .................... | 709/231 |
| 7,277,958 | B2 * | 10/2007 | Chung et al. ................. | 709/231 |
| 7,457,312 | B2 * | 11/2008 | Weiss et al. ................... | 370/468 |
| 7,668,081 | B2 * | 2/2010 | Hermsmeyer et al. ........ | 370/218 |
| 8,045,582 | B1 * | 10/2011 | Petrus et al. .................. | 370/468 |
| 8,260,913 | B2 * | 9/2012 | Knapp et al. ................. | 709/224 |
| 8,526,458 | B1 * | 9/2013 | Jensen et al. ................. | 370/432 |
| 8,719,442 | B2 * | 5/2014 | Lee et al. ...................... | 709/231 |
| 8,996,719 | B2 * | 3/2015 | Condon et al. ............... | 709/232 |
| 2002/0031097 | A1 * | 3/2002 | Jung ............................. | 370/270 |

(Continued)

OTHER PUBLICATIONS

Extended Search Report for EP11178367.6-2413 dated Nov. 25, 2011.

(Continued)

*Primary Examiner* — Michael Y Won
(74) *Attorney, Agent, or Firm* — Banner & Witcoff, Ltd.

(57) ABSTRACT

Methods, apparatuses, and software are described for implementing dynamic bandwidth load balancing in a data distribution network that provides a plurality of simultaneous video streams over a plurality of channels arranged as a plurality of bonded groups. Various factors may affect the assignment of bonded groups, from initial client device registration through subsequent video stream requests.

20 Claims, 8 Drawing Sheets

(56) References Cited

U.S. PATENT DOCUMENTS

| | | | |
|---|---|---|---|
| 2004/0013090 A1* | 1/2004 | Cashiola et al. | 370/238 |
| 2004/0024902 A1* | 2/2004 | Mikkola | 709/238 |
| 2004/0133910 A1* | 7/2004 | Gordon et al. | 725/37 |
| 2004/0205724 A1* | 10/2004 | Mayberry | 717/124 |
| 2005/0132101 A1* | 6/2005 | McEvilly et al. | 710/36 |
| 2005/0198686 A1* | 9/2005 | Krause et al. | 725/118 |
| 2006/0225118 A1 | 10/2006 | Rolls et al. | |
| 2007/0005795 A1* | 1/2007 | Gonzalez | 709/232 |
| 2008/0056293 A1 | 3/2008 | Robbins et al. | |
| 2008/0133766 A1* | 6/2008 | Luo | 709/231 |
| 2008/0162713 A1* | 7/2008 | Bowra et al. | 709/231 |
| 2008/0216135 A1* | 9/2008 | Pfeffer et al. | 725/93 |
| 2009/0135828 A1* | 5/2009 | Sim et al. | 370/394 |
| 2009/0148124 A1* | 6/2009 | Athsani et al. | 386/46 |
| 2009/0249421 A1 | 10/2009 | Liu et al. | |
| 2010/0161824 A1* | 6/2010 | Viger et al. | 709/231 |
| 2010/0179986 A1* | 7/2010 | Sebastian et al. | 709/203 |
| 2011/0030019 A1 | 2/2011 | Ulm et al. | |
| 2011/0064079 A1* | 3/2011 | Lim et al. | 370/390 |
| 2011/0072475 A1* | 3/2011 | McKiel, Jr. | 725/100 |
| 2012/0054312 A1* | 3/2012 | Salinger | 709/219 |

OTHER PUBLICATIONS

Horrobin, et al., "Cablea S Own IPTV", International Broadcasting Conference: Sep. 11, 2008-Sep. 15, 2008; Amsterdam, XP030081625.

"MAC" and Upper Layer Protocols Interface Specification, Data-Over-Cable Service Interface Specifications DOCSIS 3.0, vol. CM-SP-MULPIv3.0-I13-100611, Jun. 11, 2010, pp. 461-466, retrieved from the Internet: ,URL:http://www.cablelabs.com/specifications/CM-SP-MULPIv3.0-I13-100611.pdf>.

\* cited by examiner

DYNAMIC BANDWIDTH LOAD BALANCING IN A DATA DISTRIBUTION NETWORK

CROSS-REFERENCE TO RELATED APPLICATIONS

The present application is a continuation of U.S. patent application Ser. No. 12/862,709, filed Aug. 24, 2010, entitled "Dynamic Bandwidth Load Balancing in a Data Distribution Network," hereby incorporated by reference herein as to its entirety.

BACKGROUND

Data distribution networks often attempt to balance bandwidth loads to client devices, typically in a static manner. For example, where the data distribution network is compliant with Data Over Cable Service Interface Specification (DOCSIS), published by Cable Television Laboratories, Inc., and when multiple DOCSIS downstream channels are available, each cable modem termination system (CMTS) of the data distribution network performs load balancing for its client devices upon registration of those client devices. The load balancing determination is typically based on a simple channel loading determination at the time of registration. This static type of load balancing may not always be adequate or efficient, and so improved ways to implement load balancing may be desirable.

SUMMARY

Various aspects as described herein are directed to providing an improved way of performing load balancing.

For example, some aspects are directed to methods, apparatuses, and software stored on computer-readable media for transmitting a plurality of video streams over a plurality of channels to a plurality of client devices including a first client device, the plurality of channels being grouped as a plurality of bonded groups; receiving a request for a first video stream; determining whether the first video stream is included in a first one of the bonded groups that is currently assigned to the first client device. This may further involve transmitting a second video stream to the first client device; responsive to determining that the first video stream is not included in the first one of the bonded groups, determining whether any of the bonded groups includes both the first video stream and the second video stream; and responsive to determining that a second one of the bonded groups includes both the first and second video streams, assigning the second one of the bonded groups to the first client device.

Further aspects are directed to, for example, an apparatus, comprising a data interface configured to transmit a plurality of video streams over a plurality of channels to a plurality of client devices including a first client device, the plurality of channels being grouped as a plurality of bonded groups; and a controller coupled to the data interface. The apparatus may be configured to, responsive to receiving a request for a first video stream, determine whether the first video stream is included in a first one of the bonded groups that is currently assigned to the first client device.

Still further aspects are directed to, for example, methods, apparatuses, and software for transmitting a first video stream to a first client device; transmitting a plurality of other video streams to a plurality of other client devices, wherein the first video stream and the plurality of other video streams are transmitted over a plurality of channels that are grouped into a plurality of bonded groups; determining whether any of the plurality of bonded groups includes both the first video stream and a second video stream; choosing one of the plurality of bonded groups based on an outcome of the determining; and transmitting the first and second video streams in the chosen one of the plurality of bonded groups to the first client device.

These and other aspects of the disclosure will be apparent upon consideration of the following detailed description.

BRIEF DESCRIPTION OF THE DRAWINGS

A more complete understanding of the present disclosure and the potential advantages of various aspects described herein may be acquired by referring to the following description in consideration of the accompanying drawings, in which like reference numbers indicate like features, and wherein.

DETAILED DESCRIPTION

Figure 1:
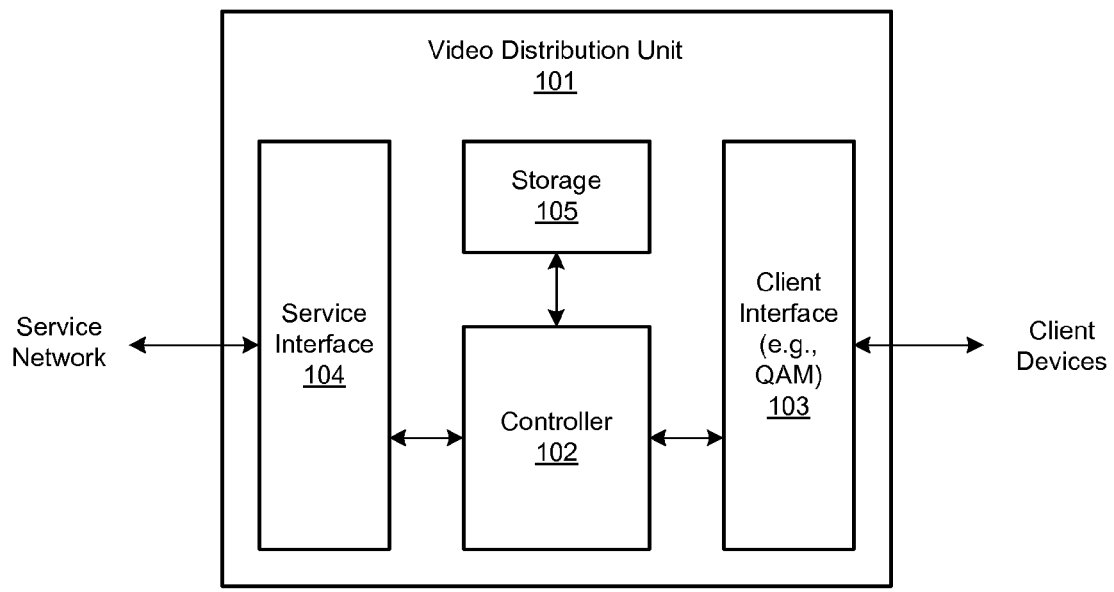
FIG. 1 is a block diagram of an example video distribution unit.

FIG. 1 is a functional block diagram of an example video distribution unit (VDU) 101 that may be used by a service or content provider, in or with a data distribution network, to provide a plurality of video streams to a plurality of client devices. In some embodiments, VDU 101 may be implemented as, or otherwise include, be associated with or be part of, a termination system (TS), such as a modem termination system (MTS). In some networks, such as hybrid fiber coaxial (HFC) networks, the TS may be a DOCSIS compliant cable modem termination system (CMTS) or a converged multiservice access platform (CMAP). In further embodiments, such as where the data distribution network includes other types of networks (e.g., a satellite network, fiber optic network, cellular telephone network, wireless network, etc.), VDU 101 may be implemented as, or otherwise include or be part of, a corresponding transmission facility. In still further embodiments, such as where the data distribution network is an Internet Protocol (IP) based network, VDU 101 may be implemented as, or otherwise include or be part of, an IP-based video distribution system. Also, although FIG. 1 shows only a single VDU 101, the data distribution network may have or be coupled to a plurality of different VDUs, each serving a different plurality of client devices.

VDU 101 in this example includes a controller 102, a client interface 103, a service interface 104, and storage 105. While various functional blocks 102-105 are shown in FIG. 1, two or more of these functional blocks may or may not be physically combined together into a single physical unit. Moreover, one or more of these functional blocks may be sub-divided into multiple physical units. In other words, the functional block division as shown in FIG. 1 may either correspond to or be independent of the physical implementation of the functional blocks. Each of blocks 102-105 will be discussed in turn below.

Controller 102 may be or otherwise include any one or more processors and/or other types of computers, and may be responsible for controlling the functionality of VDU 101. For example, any manipulation of data, decision-making functions, or any other functions attributed to VDU 101 may be performed and/or controlled by controller 102. In some embodiments, controller 102 may be or otherwise include the above-mentioned TS (e.g., MTS and/or CMTS).

A computer may be any electronic, electro-optical, and/or mechanical device, or system of multiple physically separate such devices, that is able to process and manipulate information, such as in the form of data. Non-limiting examples of a computer include one or more processors, personal computers (e.g., desktop or laptop), servers, smart phones, personal digital assistants (PDAs), television set top boxes, gateways, and/or a system of these in any combination or subcombination. In addition, a given computer may be physically located completely in one location or may be distributed amongst a plurality of locations (i.e., may implement distributive computing). A computer may be or include a general-purpose computer and/or a dedicated computer configured to perform only certain limited functions.

A computer may include hardware that may execute software to perform specific functions. The software, if any, may be stored on a tangible non-transient computer-readable medium (such as a hard drive and/or memory) in the form of computer-executable instructions. A computer may read those computer-executable instructions, and in response perform various steps as defined by those computer-executable instructions. Thus, any functions attributed to VDU 101 as described herein may be implemented, for example, by reading and executing such computer-executable instructions for performing the functions of those respective elements, and/or by any hardware subsystem from which the computer is composed. Additionally or alternatively, any of the above-mentioned functions may be implemented by the hardware of the computer, with or without the execution of software. For example, the computer may be or include an application-specific integrated circuit (ASIC), field-programmable gate array (FPGA), or other type of circuitry that is configured to perform some or all of the functions attributed to the computer.

A computer-readable medium may include not only a single intransient information storage medium or single type of such storage medium, but also a combination of one or more such storage media and/or types of such storage media. Examples of a computer-readable medium include, but are not limited to, one or more memories, hard drives, optical discs (such as CDs or DVDs), magnetic discs, and magnetic tape drives.

Such a computer-readable medium may store computer-executable instructions (e.g., software) and/or computer-readable data (i.e., information that may or may not be executable). Thus, referring to the example of FIG. 1, a computer-readable medium (such as memory and/or a hard drive) may be included in storage 105, and may store computer-executable instructions and/or data used by VDU 101. Alternatively or additionally, such a computer-readable medium storing the data and/or computer-executable instructions may be physically separate from, yet accessible by, VDU 101.

Service interface 104 may be or otherwise include hardware and/or software for communicating with the data distribution network. For example, any video content to be passed on to the client devices may be received by one or more physical and/or logical ports of service interface 104. Also, any requests to or from VDU 101 to the data distribution network may be sent via service interface 104. Thus, service interface 104 may include bi-directional communication capability with the data distribution network. The service interface 104 may be, for example, a modem (e.g., coaxial cable modem, fiber optic modem), cellular or other wired or wireless transceiver, etc.

Client interface 103 may be or otherwise include hardware and/or software for communicating with the client devices. For example, any video content to be streamed or otherwise transmitted to the client devices may be sent via one or more physical and/or logical ports of client interface 103. Also, any requests from the clients to VDU 101 may be received via client interface 103. Thus, client interface 103 may also include bi-directional communication capability with the client devices. Client interface 103 may output the video content as data, which may or may not be modulated into one or more frequency bands or other types of channels. For example, where the data is modulated, client interface 103 may include a modem for performing the modulation. Additionally or alternatively, client interface 103 may include or be coupled to one or more quadrature amplitude modulators (QAMs) where the video is desired to be sent to the client devices as QAM modulated streams. The client interface 103 may be, for example, a Multimedia Over Coax Alliance (MoCA) interface circuit, an Ethernet router, an IEEE 802.11 wireless access point, BLUETOOTH transceiver, or any other desired interface for communications with the client devices. In further aspects, client interface 103 may communicate with the client devices using Internet Protocol over a packet-switched network.

Thus, VDU 101 may receive video content from the data distribution network, and may distribute that video content to the client devices as one or more video streams that may be organized into one or more bonded groups. VDU 101 may also perform other functions, such as but not limited to determining which video content will be streamed in which bonded groups (e.g., for the purpose of load balancing), compression (including re-compression) of video content, handshaking and registration with the client devices, and responding to requests from client devices. In some embodiments, especially where the data distribution network is or includes a cable or HFC network, communications and video streaming with the client devices may be in accordance with Data Over Cable Service Interface Specification (DOCSIS). However, other standards and protocols may additionally or alternatively be used.

The video as referred to herein may also optionally include audio and/or any other data along with the video. For example, a video stream may be limited to only video, or may include both audio and video, or may include video, audio, and data (e.g., closed-captioning data, interactive applications, etc.). Video streams may be encoded in any desired manner, and may or may not be encrypted and/or compressed as desired.

Figure 2:
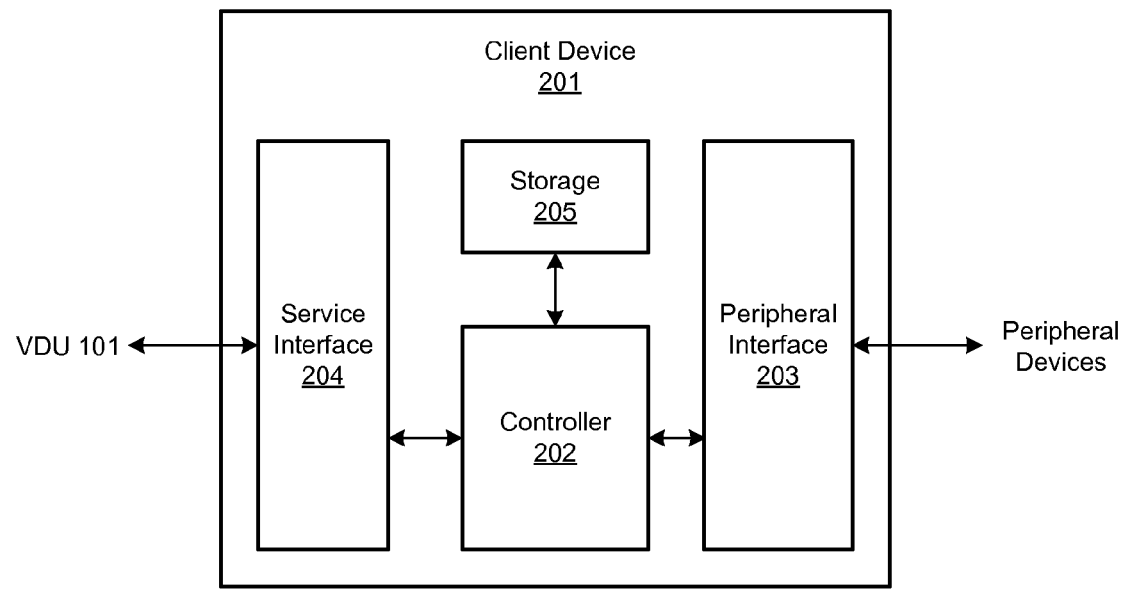
FIG. 2 is a block diagram of an example client device.

The client devices may each be embodied as shown, for example, in the functional block diagram of FIG. 2. Each of the client devices may be configured to receive and tune to one or more of the video streams received from video distribution unit 101, and to send information to VDU 101.

Client device 201 in this example includes a controller 202, a peripheral interface 203, a service interface 204, and storage 205. While various functional blocks 202-205 are shown in FIG. 2, two or more of these functional blocks may or may not be physically combined together into a single physical unit. Moreover, one or more of these functional blocks may be sub-divided into multiple physical units. In other words, the functional block division as shown in FIG. 2 may either correspond to or be independent of the physical implementation of the functional blocks. Each of blocks 202-205 will be discussed in turn.

Like controller 102 discussed previously, controller 202 may be or otherwise include any one or more processors and/or other types of computers, except in this case controller 202 may be responsible for controlling the functionality of client device 201. For example, any manipulation of data, decision-making functions, tuning functions, and any other functions attributed to client device 201 may be performed and/or controlled by controller 202.

Client device 201 may be any type of device capable of receiving and consuming video streams, such as by recording the video streams to a computer-readable medium and/or causing the video streams to be displayed or otherwise presented as video and/or audio. Non-limiting examples of client devices include display devices, personal computers, portable computers such as smart phones, laptop computers, and tablet computers, mobile television devices, gateways, set top boxes, digital video recorders, and home media servers.

Client device 201 may be or include a computer. Thus, any functions attributed to client device 201 as described herein may be implemented, for example, by reading and executing computer-executable instructions for performing those functions, and/or by any hardware subsystem from which the computer is composed. Additionally or alternatively, any of the functions of client device 201 may be implemented by the hardware of the computer, with or without the execution of software.

The computer-executable instructions and/or data used by client device 201 may be stored in storage 205. Storage 205 may or include be any type of computer-readable medium.

Service interface 204 may be or otherwise include hardware and/or software for communicating with VDU 101. For example, any video content streamed to client device 201 may be received by one or more physical and/or logical ports of service interface 204. Accordingly, client interface 103 of VDU 101 and service interface 204 of client device 201 may be directly or indirectly coupled together. Also, any requests from client device 201 to VDU 101 may be sent via service interface 204. Thus, service interface 204 may include bi-directional communication capability with VDU 101.

Service interface 204 and/or controller 202 may also implement or otherwise include a tuner for selectively tuning to one or more (e.g., a subset) of a larger plurality of video streams provided (e.g., streamed) by VDU 101. The particular streams to which client device 201 is tuned to may depend upon user commands (via peripheral interface 203) and/or other data provided by VDU 101 (via service interface 204). Where the video streams are sent as streams of data packets, tuning as referred to herein may include known techniques such as selectively choosing certain ones of the received data packets based on identifiers in those packets (such as program identifiers or IP addresses) and/or tuning into a selected portion of total available frequency bandwidth over which the data packets may be modulated.

Peripheral interface 203 may be or otherwise include hardware and/or software for communicating with one or more peripheral devices, such as television sets, other types of video displays, remote controls, and keyboards. For example, video content and data (e.g., electronic program data) tuned to and received via video streams may be presented for display on a television set or other video display via a video port of peripheral interface 203. As another example, user selections of video streams and/or of various options may be made via a remote control, and indications of these user selections may be communicated to client device 201 via an infrared or radio frequency remote control port of, for example, peripheral interface 203.

Figure 3:
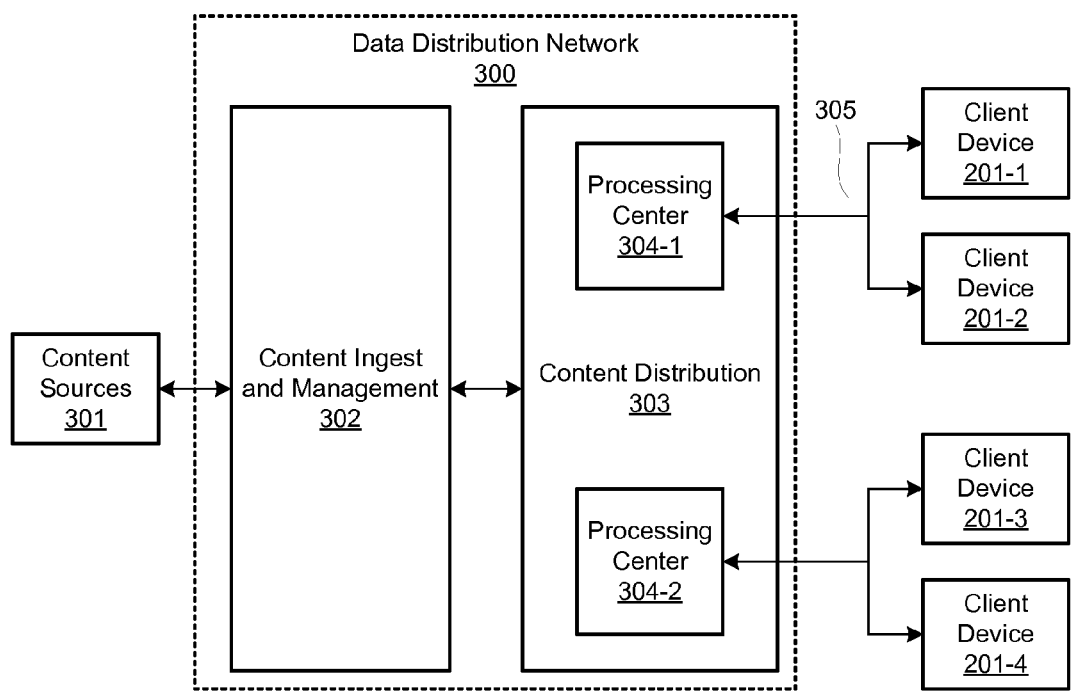
FIG. 3 is a block diagram of an example system including a data distribution network in accordance with an embodiment of the present disclosure.

FIG. 3 illustrates an example data distribution network 300 on which many of the various features described herein may be implemented. Network 300 may be any type of data distribution network, such as satellite, telephone, cellular, wireless, etc. One example may be an optical fiber network, a coaxial cable network or an HFC distribution network. Such networks 300 use a series of interconnected communication lines or links 305 (e.g., coaxial cables, optical fibers, wireless, etc.) to connect multiple customers having client devices 201 to a processing center (e.g., headend) 304. In this example, network 300 has two processing centers 304-1 and 304-2, each of which may serve a different subset of the client devices 201.

Network 300 in this example may include a content ingest and management portion 302, which may receive content (e.g., video content) from one or more content sources 301, and may further transform (e.g., transcode) and/or store the content for eventual distribution by a content distribution portion 303, which may include the one or more processing centers 304.

The processing centers 304 may each transmit downstream data signals onto the lines 305 (which may be any type of communication link), and as discussed previously, each client device 201 may have a tuner used to receive and process those signals. There may be, for example, one line 305 originating from each processing center 304, and it may be split a number of times to distribute the signal to various homes containing or otherwise associated with the client devices 201 that are in the vicinity (which may be many miles) of the processing center 304. The lines 305 may include components not illustrated, such as splitters, filters, amplifiers, etc. to help convey the signal clearly, but in general each split introduces a bit of signal degradation. Portions of the lines 305 may also be implemented with fiber-optic cable, while other portions may be implemented with coaxial cable, other lines, or wireless communication paths. By running fiber optic cable along some portions, for example, signal degradation in those portions may be significantly minimized, allowing a single processing center 304 to reach even farther with its network of lines 305 than before.

Each processing center 304 may include one or more of the VDUs 101. As discussed previously, each VDU 101 may include or be supplemented with a termination system (TS), such as a cable modem termination system (CMTS), which may be a computing device configured to manage communications between devices on the network of lines 305 and backend devices such as content sources (e.g., video on demand servers, television program sources, etc.), headend computers and other networks. The TS may be as specified in a standard, such as the DOCSIS standard, or it may be a similar or modified device instead. The TS may be configured to place data (such as video streams) on one or more bonded groups of downstream channels to be received by client devices 201, and to receive upstream communications from those client devices 201 on one or more upstream channels, as well as to serve as an interface to devices and networks that are further upstream, such as other Internet Protocol-compliant devices.

Figure 4:
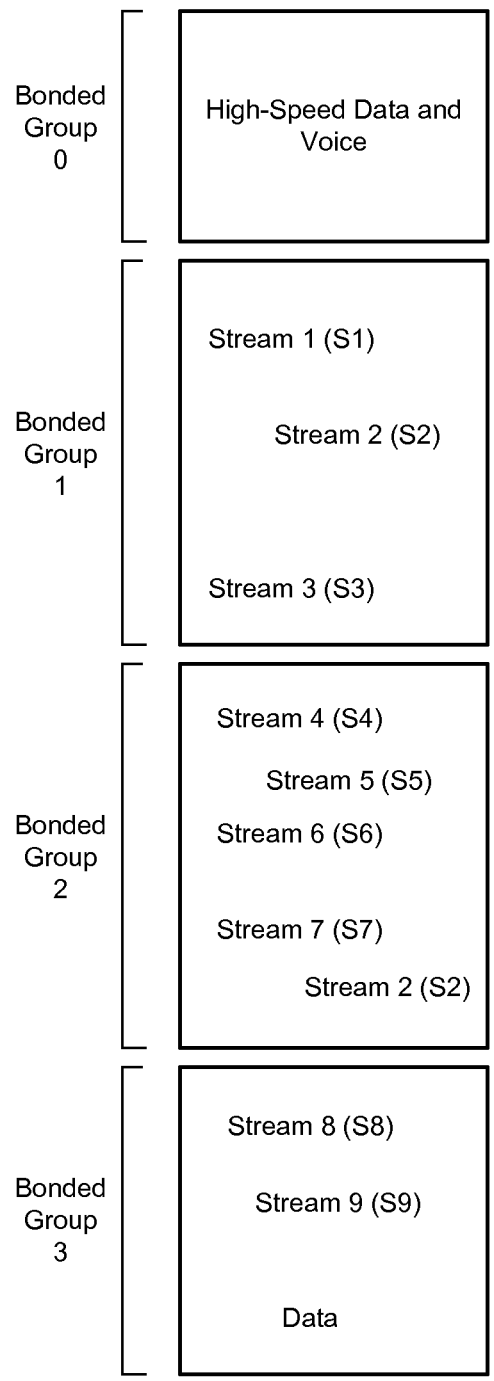
FIG. 4 shows an example of video streams logically arranged as bonded groups in accordance with an embodiment of the present disclosure.

As mentioned previously, the downstream channels may be grouped into a plurality of bonded groups, such as those types of bonded groups provided for under DOCSIS. Each bonded group may be considered a wider bandwidth channel equal to the sum of the bandwidths of the narrower channels in that bonded group, thereby allowing for data (such as video streams) in a given bonded group to be striped across any arbitrary fashion across multiple ones of the narrower channels, for example. An example of various bonded groups is shown in FIG. 4, which shows four bonded groups: bonded group 0, bonded group 1, bonded group 2, and bonded group 3. In this example, although not all bandwidth is currently in use, bonded group 0 currently has sufficient assigned or allocated bandwidth to carry up to three simultaneous video streams, each of bonded groups 1 and 2 currently has sufficient assigned or allocated bandwidth to carry up to five simultaneous video streams, and bonded group 3 currently has sufficient assigned bandwidth to carry up to four simultaneous video streams and another data stream (e.g., a non-video data stream). Thus, where each traditional narrower-band channel is, e.g., 6 MHz, then in this example, bonded group 0 carries high-speed data (e.g., Internet service) and voice (e.g., telephone) and currently has a bandwidth capacity of 18 MHz. Bonded groups 1 and 2 each currently has a bandwidth capacity of 30 MHz, and bonded group 3 currently has a bandwidth capacity of 24 MHz. Thus, various simultaneous video streams and/or other types of data streams may be organized into one or more bonded groups. To provide for this bandwidth, each bonded group may group together a plurality of narrower-bandwidth channels (such as traditional 6 MHz DOCSIS video channels commonly used in an HFC-type system).

While in this example, 6 MHz channels are discussed as being utilized, the channels may be of other bandwidths and may even be of differing bandwidths within the same bonded group. Also, while bonded groups having three, four, or five channel capacity are shown in FIG. 4, this is merely an example used for simplicity. A bonded group may bond together as many channels as desired. Moreover, there may be greater or fewer than four bonded groups in any given system, and the number of bonded groups may change over time.

Depending upon the implementation, each bonded group may be implemented as, for example, a DOCSIS wideband channel as commonly used in an HFC-type system. Channel bonding may allow for load-sharing by logically combining multiple channels, where each individual channel may have, for example, a different frequency band of a width sufficient to carry a single video stream but not necessarily multiple streams. However, channel bonding is not limited to bonding of pure frequency-based channels, and may be used to bond any portions of available bandwidth together. For example, in addition to or as an alternative to different frequency bands, channels may be e.g., different fiber optic transmission modes. Moreover, while various example embodiments of channel bonding are discussed herein with regard to DOCSIS transmission, channel bonding may be used in conjunction with other transmission standards as well.

Where, for instance, each channel has bandwidth sufficient to carry a payload of N Mbps, then load sharing traffic across multiple channels (e.g., across multiple frequency bands) over a bonded group of those channels may provide a maximum throughput of up to (n×N) Mbps, where n is the number of channels that are bonded together in a particular bonded group. In some DOCSIS implementations, for example, the value of N for downstream channels is currently about 38 Mbps in the United States and about 50 Mbps in Europe. However, aspects as described herein may be used with any bandwidth of channels and of bonded groups. Moreover, the bandwidth of a given bonded group may be static or may dynamically change over time as desired. For example, a given bonded group may add or remove channels over time, to provide additional bandwidth or remove unnecessary bandwidth set aside for that bonded group.

Figure 5:
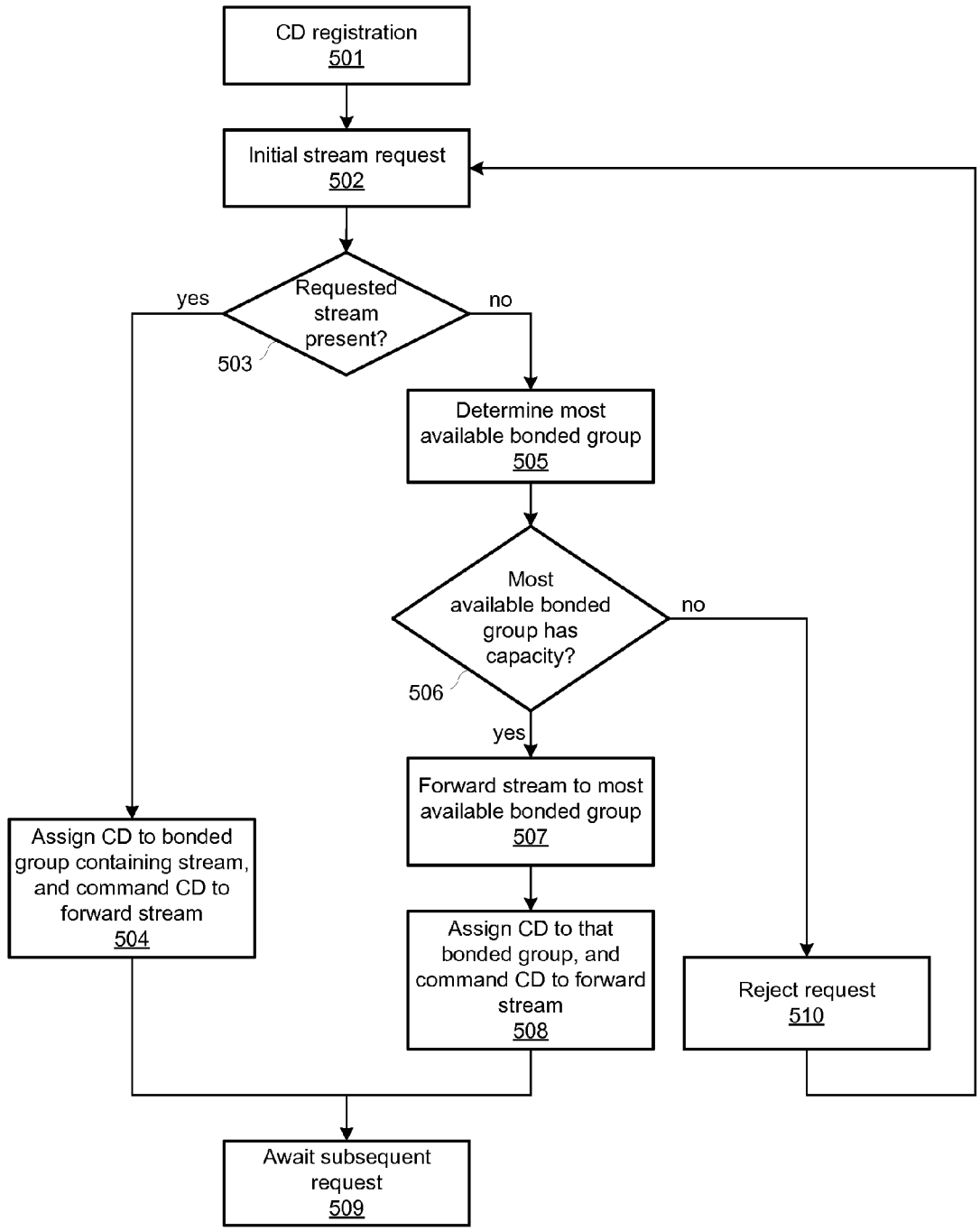
FIGS. 5 and 6 illustrate flow charts showing an example method that may be performed by the video distribution unit of FIG. 1, by the client device of FIG. 2, and/or by other elements in the data distribution network.
Figure 6:
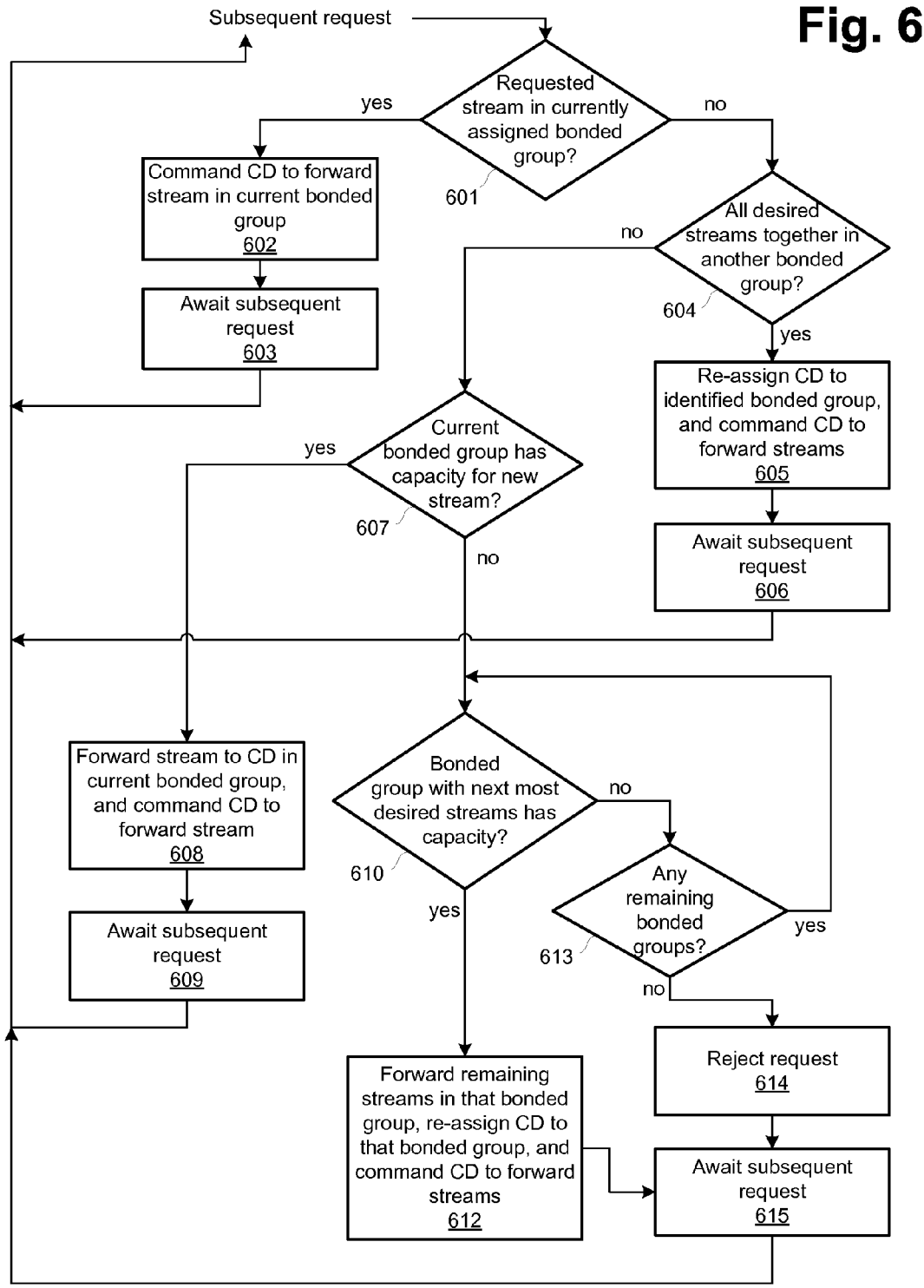

FIGS. 5 and 6 show flow charts of an example method that may be performed by video distribution unit (VDU) 101, by client device 201, and/or by other elements in the data distribution network. In particular, the flow chart illustrates examples of how client device 201 may be registered with the data distribution network and assigned one or more default bonded groups, and events that may occur in response to requests by client device 201 to change which video streams are streamed to client device 201, for example. The example of FIGS. 5 and 6 may implement two modes that may occur in the process with respect to a given client device. A first mode or state (referred to herein as Mode 1) is shown in FIG. 5 and may be in effect upon initial registration of client device 201 (e.g., after a power-on or reset of client device 201) with the data distribution network and may affect system operation in response to an initial stream request by client device 201.

A second mode or state (referred to herein as Mode 2) is shown in FIG. 6 and may be in effect after an initial stream is forwarded to client device 201, and may affect system operation in response to any subsequent stream change request from client device 201. One or more factors, such as whether the requesting client device is also simultaneously assigned to another video stream in the bonded group and/or whether other bonded groups also carry both the requested video stream and one or more other assigned video streams, may affect which bonded group and/or stream(s) is/are assigned to the requesting client device. In this way, the various bonded groups may be balanced and utilized with potentially fewer video stream replications amongst the bonded groups and/or potentially allow for a shorter processing time associated with balancing the load. The particular mode in effect is determined relative to each client device. Thus, some client devices may be in Mode 1 while other client devices served by the same or a different VDU may be in Mode 2.

If all of the streams to client device 201 are ever torn down or otherwise terminated (e.g., due to a re-boot or reset of client device 201, or due to streams previously being forwarded to client device 201 ending), then the system may return to Mode 1 with respect to that client device 201. The state of each client device 201, which may be determinative of which mode that the process is in with respect to that client device, may be stored by client device 201 and/or in the data distribution network, such as by VDU 101.

Referring to Mode 1 as illustrated in FIG. 5, at block 501, a client device 201 (also referred to as "CD" in the drawings) will initially register with the data distribution network.

As will be referred to in further examples, two or more streams may be simultaneously received and consumed (e.g., processed and/or rendered) by a given client device 201, because many client devices typically have multi-tuning capability. In some of such multi-tuning devices, it may be desirable that some or all of the streams being tuned to are within the same bonded group. However, some multi-tuning client devices may be capable of simultaneously tuning to streams in two or more different bonded groups. Although some example streams are depicted in FIGS. 7-11, it is to be understood that the various bonded groups may be simultaneously carrying other streams as well that are not depicted in those figures. Also, although certain streams are shown as being directed to (forwarded to) certain client devices, in practice all of the client devices may be exposed to (receiving) those streams and simply not forwarding all streams for rendering or other consumption, such as for display on a video screen or recording on a DVR. Thus, a particular stream being depicted as directed to a particular client device may simply mean that the client device is tuned to that stream and is either consuming that stream or forwarding that stream to a consumption function of the client device (e.g., an audio/video output port of the client device).

In block 502 of FIG. 5, VDU 101 next awaits an initial video or other content stream request from client device 201. Upon receipt of an initial request from client device 201 for a particular video stream, the process moves to Mode 2 and it is determined at block 503 by VDU 101, or another element of the network, whether the requested video stream is currently being streamed by VDU 101 in any of the bonded groups that is being streamed by VDU 101 to any client device. If so, then at block 504 client device 201 is reassigned or assigned to the bonded group that is currently streaming the requested stream, and also assigned to (tuned to) the requested video stream, such as by commanding client device 201 to forward the requested video stream to its consumption function or to otherwise process the stream as requested by the user. At this point, client device 201 is now receiving and consuming the requested stream.

Figure 7:
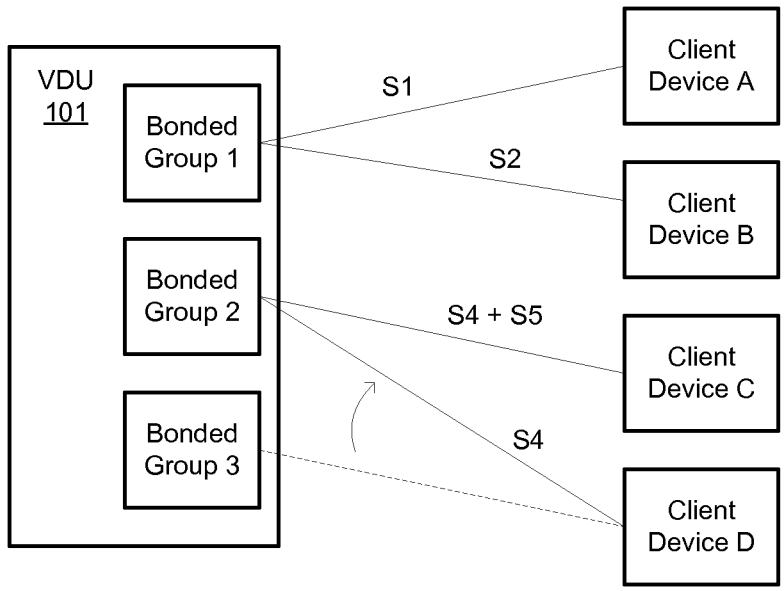
FIG. 7 is a block diagram showing an example configuration of bonded group configurations in accordance with an embodiment of the present disclosure.

An example of the stream assignment in block 504 is as follows. With reference to FIG. 7, assume that client device D requests stream S4, which is determined by VDU 101 to be currently streaming in bonded group 2. Thus, VDU 101 assigns client device D to bonded group 2 and stream S4, as graphically indicated in FIG. 7.

Referring again to FIG. 5, if in block 503 it is determined that the requested stream is not currently being streamed in one of the bonded groups, then at block 505 the bonded group having the most available bandwidth is determined, and it is further determined at block 506 whether the bonded group with the most available (e.g., unused) bandwidth capacity has the capacity to add the requested stream. If so, then at block 507 the requested stream is streamed in the most available bonded group. This determination may be made by VDU 101 and/or another element in the network. Where two or more bonded groups are capable of carrying the requested stream, e.g., if there is a tie between bonded groups, then one of those bonded group may be arbitrarily chosen. At block 508, client device 201 is reassigned to that most available bonded group and to the newly-requested stream now contained in that bonded group, such as by commanding client device 201 to forward the requested stream to its consumption function or to process the requested stream in another manner such as desired by the requesting user.

If the bonded group with the most available bandwidth capacity does not have sufficient capacity to add the requested stream, then the request by client device 201 may be rejected at block 510, and the process returns to block 502 to await another "initial" stream request. Even though the next stream request is technically not the very first stream request, for purposes of the process in this aspect of the disclosure, the next stream request would be considered an initial stream request because the client device is still not currently tuned to any stream.

Figure 8:
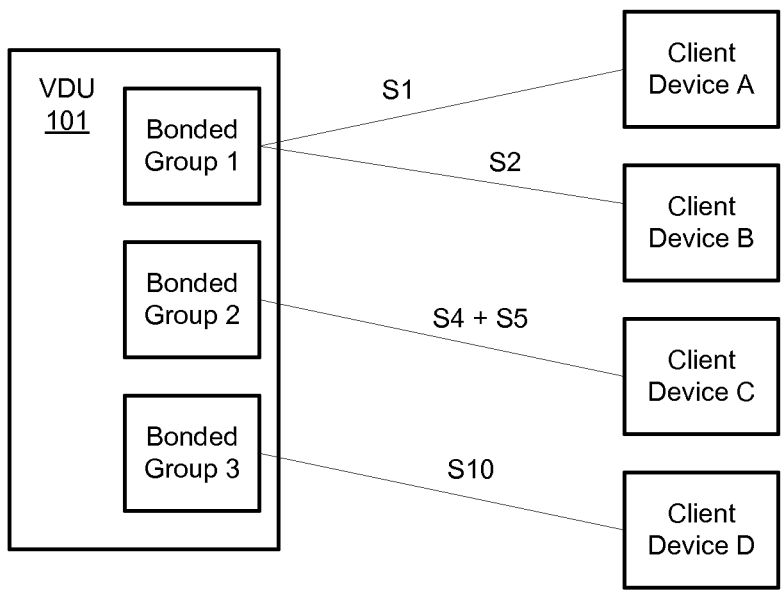
FIG. 8 is a block diagram showing an example configuration of bonded group configurations in accordance with an embodiment of the present disclosure.
Figure 9:
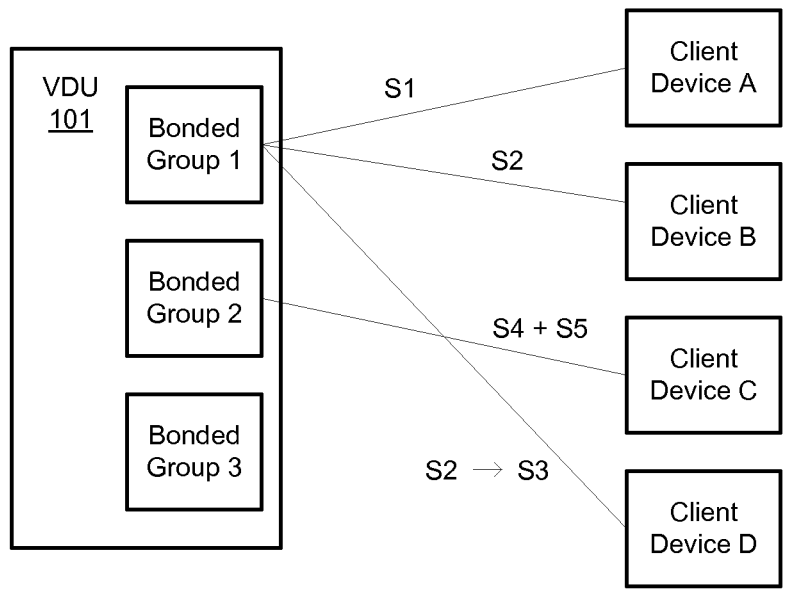
FIG. 9 is a block diagram showing an example configuration of bonded group configurations in accordance with an embodiment of the present disclosure.

The following is an example of bonding group and stream assignment as shown in blocks 505-508. With reference to FIG. 8, assume that client device D requests stream 10 (S10), which is not currently being streamed at all. In that case, VDU 101 determines that bonded group 3 is the most available, and assuming bonded group 3 has sufficient capacity, stream S10 is added (e.g., replicated or generated) to bonded group 3, and client device D is assigned to bonded group 3 and stream S10. The result of this reassignment is graphically shown in FIG. 8.

Referring again to FIG. 5, and upon block 504 or blocks 505-507 being performed, then at block 509, VDU 101 awaits a subsequent stream request from client device 201. Referring now to FIG. 6, responsive to receiving the subsequent stream request from client device 201, the process moves to Mode 2 and it is determined at block 601 whether the requested stream is contained in (e.g., streamed by) a bonded group that is currently assigned to client device 201. If so, then at block 602 client device 201 is maintained in the same bonded group and assigned to the requested stream, such as by commanding client device 201 to forward the requested stream to its consumption function. Next, at block 603, the process may wait for another subsequent stream request, and upon receiving another subsequent stream request, the process returns to block 601. An example of how blocks 601-603 may operate is graphically shown in FIG. 9, in which client device D is currently assigned to stream S2 of bonded group 1, and requests to switch to stream S3. Since stream S3 is also currently included in bonded group 1, client device D is maintained in bonded group 1 and simply reassigned or otherwise switched from stream S2 to stream S3.

Figure 10:
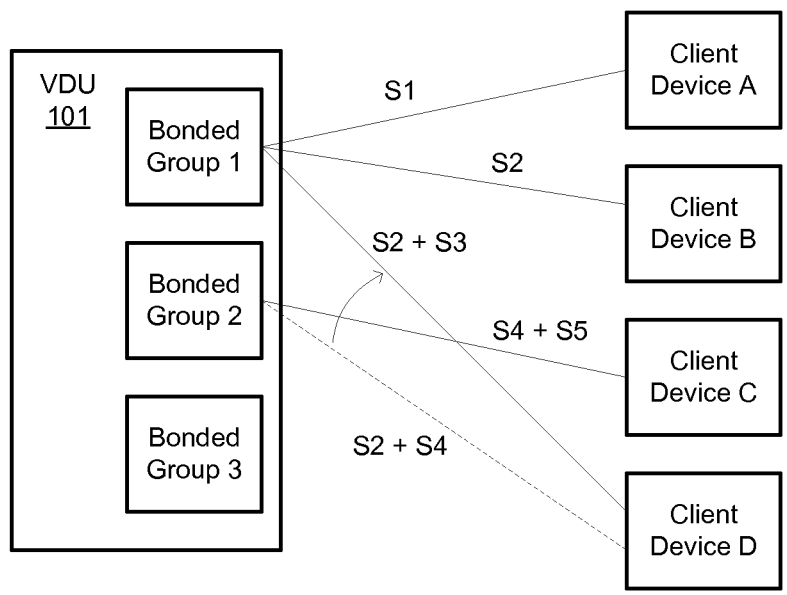
FIG. 10 is a block diagram showing an example configuration of bonded group configurations in accordance with an embodiment of the present disclosure.

If, at block 601, it is instead determined that the requested stream is not contained in a currently-assigned bonded group, then at block 604 it may be determined whether the requested stream and any other streams also simultaneously assigned to that client device are all contained together in any bonded group. For example, as shown in FIG. 10, if client device D is currently assigned/tuned to streams S2 and S4, and if stream S3 is desired to replace stream S4, then at block 604 it is determined whether there is any bonded group that contains both the requested stream (stream S3) and the other streams desired to still be tuned to (in this case, stream S2). If the outcome of block 604 is that such a bonded group is identified, then at block 605 the requesting client device 201 is reassigned to that identified bonded group (and client device 201 may be commanded by VDU 101 to forward the assigned streams to its consumption function), and at block 606 the process awaits another subsequent stream change request. Upon receiving the subsequent request, the process returns to block 601.

Figure 11:
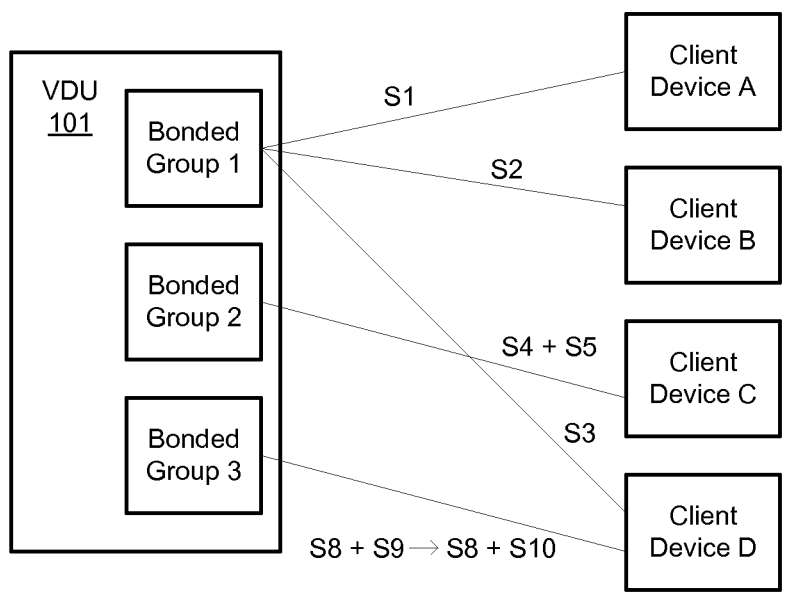
FIG. 11 is a block diagram showing an example configuration of bonded group configurations in accordance with an embodiment of the present disclosure.

Returning to FIG. 6, if at block 604 it is determined that the desired streams are not contained together in the same bonded group, then at block 607 it is determined whether the currently-assigned bonded group has capacity to add the newly-requested stream. If so, then at block 608 the requested stream is added to the current bonded group, and at block 609 the process awaits another subsequent stream change request, at which point the process returns to block 601. An example of the operation shown in blocks 607-609 is illustrated in FIG. 11, wherein if client device D is currently assigned to streams S8 and S9 of bonded group 3 and requests to change from stream S9 to stream S10, then according to block 608, stream S10 would be added to bonded group 3 and assigned to client device D. Stream S9 may either remain in bonded group 3 (but no longer be directed to client device D) or be removed, as desired.

If, on the other hand, it is determined at block 607 that no capacity exists in the currently-assigned bonded group to add the requested stream, then at block 610 it is determined whether there exists a bonded group that contains the next largest subset of the requested stream and any existing stream(s) tuned to or otherwise being utilized by client device 201. For example, if there are a total of four streams desired to be tuned to by client device 201, then a bonded group containing the next largest subset would be a bonded group containing three out of those four streams. If so, then at block 612, client device 201 is reassigned to one of the bonded groups and the needed remaining streams are added to that reassigned bonding group. Then, client device 201 may tune to those streams in the new bonded group, such as in response to a command from VDU 101 to forward those streams to its consumption function.

If there does not exist that next largest subset, then at block 613 it is determined whether there are any remaining bonded groups not yet inspected in block 610. If so, then the process moves back to block 610 with regard to yet the next largest subset of the requested stream and any existing stream(s) tuned to by client device 201. For example, if again there are a total of four streams desired to be tuned to by client device 201, then the next largest subset would be another bonded group containing three of those streams or a bonded group containing two of those streams. If there are no bonded groups remaining, then the stream request may be rejected at block 614. The process may await another subsequent stream request from client device 201 at block 615, at which point the process returns to block 601. Finding a new bonded group in this iterative way may reduce the number of replications of the streams to client device 201 that would be needed as a result of the reassignment.

It will be understood that the process illustrated in FIGS. 5 and 6 may be performed with respect to any and all of the client devices served by VDU 101 (and/or by any other VDUs in the network). At any given time, the process of FIGS. 5 and 6 may be at a different mode and/or process block for each respective one of the client devices. Thus, the process of FIGS. 5 and 6 may be continuously and repetitively implemented independently for each of the client devices served by VDU 101.

Moreover, it will be understood that the various aspects described herein, such as the process of FIGS. 5 and 6, are merely illustrative, and modifications thereof are contemplated. For example, some of the process steps may be re-ordered, merged, omitted, and/or subdivided as desired, while still achieving a desired effect.

Thus, various example methods, apparatuses, and software have been described for implementing dynamic bandwidth load balancing in a data network that provides a plurality of simultaneous video streams arranged in a plurality of bonded groups. Various factors may affect the assignment of bonded groups and streams, from initial client device registration through subsequent video stream requests.

The invention claimed is:

1. A method, comprising:
transmitting a plurality of data streams to a plurality of devices comprising a first device, the plurality of data streams being grouped as a plurality of groups;
receiving, by at least one computing device, a request for a first data stream;
determining, by the at least one computing device, responsive to a determination that none of the plurality of groups comprises both the first data stream and all data streams that are currently assigned to the first device, a first one of the groups that comprises both:
the first data stream, and
a subset of all the data streams that are currently assigned to the first device;
adding, to the first one of the groups, at least one other data stream of all the data streams that are currently assigned to the first device; and
assigning, to the first device, the first one of the groups that was determined.

2. The method of claim 1, further comprising transmitting the first one of the groups that comprises the first data stream, the subset, and the at least one other data stream.

3. The method of claim 1, wherein the method further comprises determining a capacity of the first one of the groups, and wherein the determining the first one of the groups comprises determining the first one of the groups so as to comprise a largest subset of all the data streams currently assigned to the first device, and such that the capacity of the first one of the groups is sufficient to add the at least one other data stream.

4. The method of claim 1, wherein the first data stream comprises video data.

5. The method of claim 1, wherein the assigning comprises communicating, by the at least one computing device, with the first device.

6. The method of claim 1, wherein the first data stream is one of the plurality of data streams.

7. The method of claim 1, wherein when the determining is performed, the first data stream is currently unassigned to the first device.

8. The method of claim 1, wherein the assigning comprises the first device receiving, and presenting for display, at least the first data stream.

9. The method of claim 1, wherein the transmitting comprises transmitting each of at least some of the plurality of data streams in a different channel, each of the different channels having a bandwidth other than 6 MHz.

10. The method of claim 1, wherein the transmitting comprises transmitting at least some of the plurality of data streams to the first device over a telephone network.

11. The method of claim 1, wherein at least one group of the plurality of groups has a bandwidth different from a bandwidth of another group of the plurality of groups.

12. The method of claim 1, wherein a bandwidth of at least one group of the plurality of groups dynamically changes over time.

13. A method, comprising:
transmitting a plurality of data streams to a plurality of devices comprising a first device;
determining, by at least one computing device, whether one of a plurality of groups of the plurality of data streams comprises both:
a first data stream, and
all data streams that are currently assigned to the first device;
responsive to determining that none of the plurality of groups comprises both the first data stream and all the data streams that are currently assigned to the first device, determining at least a first group of the plurality of groups that comprises both:
the first data stream, and
a subset of all the data streams that are currently assigned to the first device; and
adding, to the first group, at least one other data stream of all the data streams that are currently assigned to the first device.

14. The method of claim 13, wherein prior to performing both of the determining steps, the first device is assigned to a second group, different from the first group, of the plurality of groups.

15. A method, comprising:
  transmitting, by at least one transmitter device, a plurality of data streams to a plurality of devices comprising a first device;
  determining, by at least one computing device, responsive to finding no group of the plurality of data streams that comprises both a first data stream and all data streams that are currently assigned to the first device, a first group that comprises both:
    a first data stream, and
    a subset of all data streams that are currently assigned to the first device;
  adding, to the first group, at least one other data stream of all the data streams that are currently assigned to the first device; and
  transmitting, by the at least one transmitter device to at least the first device, the first group that comprises the first data stream, the subset, and the at least one other data stream.

16. The method of claim 15, wherein each of a plurality of groups of the plurality of data streams comprises at least two data streams of the plurality of data streams.

17. The method of claim 15, further comprising determining whether the first group has bandwidth available to add the at least one other data stream, and if so, then performing the adding.

18. The method of claim 15, wherein the determining the first group comprises determining the first group such that the first group has a largest subset of all the data streams that are currently assigned to the first device, as compared with others of a plurality of groups of the plurality of data streams.

19. The method of claim 15, wherein the transmitting comprises transmitting each of a plurality of groups of the plurality of data streams over a different frequency band.

20. The method of claim 15, further comprising tuning, by the first device, to at least the first data stream included in the first group.

* * * * *